United States Patent
Anderson et al.

(10) Patent No.: US 7,069,510 B2
(45) Date of Patent: Jun. 27, 2006

(54) IN-VEHICLE AUDIO BROWSER SYSTEM HAVING A COMMON USABILITY MODEL

(75) Inventors: W. Michael Anderson, Woodinville, WA (US); Bruce Alan Johnson, Woodinville, WA (US); William David Sproule, Woodinville, WA (US); Polita Mila Huff, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 10/050,771

(22) Filed: Jan. 16, 2002

(65) Prior Publication Data

US 2003/0137543 A1    Jul. 24, 2003

(51) Int. Cl.
  *G06F 3/00*    (2006.01)
  *H04B 1/00*    (2006.01)

(52) U.S. Cl. .................. 715/716; 715/771; 715/717; 715/718; 715/854; 455/345; 455/154.1; 455/158.2; 455/180.1; 455/188.1; 701/36

(58) Field of Classification Search ................ 715/716, 715/854, 840, 841, 717, 718, 727, 771, 970, 715/738, 739, 864; 701/36, 206, 207–209, 701/211; 455/347–349, 345, 344, 150.1, 455/151.1, 152.1, 151.4, 154.1, 158.1, 158.2, 455/158.4, 179.1, 180.1, 188.1
See application file for complete search history.

(56) References Cited

U.S. PATENT DOCUMENTS

| | | | |
|---|---|---|---|
| 5,519,410 A | 5/1996 | Smalanskas et al. | |
| 5,949,345 A | 9/1999 | Beckert et al. | |
| 6,009,363 A * | 12/1999 | Beckert et al. | ......... 455/345 X |
| 6,055,478 A | 4/2000 | Heron | |
| 6,198,996 B1 | 3/2001 | Berstis | |
| 6,201,540 B1 | 3/2001 | Gallup et al. | |
| 6,407,750 B1 * | 6/2002 | Gioscia et al. | ............. 715/716 |
| 6,427,115 B1 * | 7/2002 | Sekiyama | .................. 701/208 |
| 6,628,928 B1 * | 9/2003 | Crosby et al. | ....... 455/150.1 X |
| 6,725,022 B1 * | 4/2004 | Clayton et al. | .......... 455/154.1 |
| 6,829,475 B1 * | 12/2004 | Lee et al. | ............... 455/345 X |
| 6,871,060 B1 * | 3/2005 | Strohmeier | ................. 455/345 |
| 2002/0002039 A1 | 1/2002 | Qureshey et al. | |
| 2002/0081985 A1 | 6/2002 | Liu et al. | |

OTHER PUBLICATIONS

"Car Radio with Traffic Monitor Feature", IBM Technical Disclosure Bulletin, UK Issue No. 449, p. 1531, Sep. 1, 2001.*

"HiQOS-BUS Multimedia Data Bus for In-Vehicle Information Systems", Sakai, J.; Satoh, I.; Tomonoh, M.; Sakai, T.; Ibaraki, S.; Kurosaki, T.; Kitao, M.; Ikeda, T., Matsushita Technical Journal, vol. 44, No. 3, pp. 125-132, Jun. 1998 (Dialog search document—no English version available).

(Continued)

*Primary Examiner*—Raymond J. Bayerl
(74) *Attorney, Agent, or Firm*—Lee & Hayes, PLLC

(57) ABSTRACT

An in-vehicle audio browser includes a first set of buttons that are configured to select a preset item. A second set of buttons move forward and backward through a list of items in the audio browser. A third button selects among multiple bands associated with the audio browser. A fourth button activates a function that varies depending on the selected band. The audio browser supports primary audio control bands that affect the audio outputs when selected and conditional audio control bands that do not affect the audio output unless some action on the band requires audio output.

32 Claims, 4 Drawing Sheets

OTHER PUBLICATIONS

"A Car Radio with Recording and Playback Functions", Morihiro, M.; Minoru, N.; Shiratani, Y., Ieee Transactions on Consumer Electronics, vol. CE-32, No. 3, pp. 509-515, Aug. 1998.

"The Network Vehicle—A Glimpse into the Future of Mobile Multi-Media", Lind, R.; Schumacher, R.; Reger, R.; Olney, R.; Yen, H.; Laur, M.; Freeman, R. , IEEE Aerospace and Electronic Systems Magazine, vol. 14, No. 9, pp. 27-32, Sep. 1999.

"Development of a Road-Automobile Communication System (RACS)", Shibano, Y.; Ikeda, J.; Iwai, T.; Kanazaki, Y.; Okada, N.; Norikane, T.; Fujie, K.; Nishio, M., Sumitomo Elctric Technical Review, No. 31, pp. 105-112, Jan. 1991.

"Voice Recognition Digital Cipher Lock for Smart Vehicles", 1993, IEEE, pp. 352-355.

"Custom Cars for Every Driver", Allison Wright, ComputerWorld, Mar. 2001, 1 page.

"The Implications of Engine Management Systems in Vehicle Security", Kershaw and Wright, IMechE, 1989, 8 pages.

"Automotive Application of Biometric Systems and Fingerprint", Lichtermann and Pettit, Human Factors in 2000: Driving, Lighting, Seating Comfort, and Harmony in Vehicle Systems. SAE 2000 World Congress. Mar. 2000. pp. 1-8.

"Safe Access, Ignition and Convenience at the Driver's Fingertips", Siemens Automotive Corp., News Release, Sep. 1999, 3 pages.

"Integrating Face Recognition into Security Systems", Vetter, Zielke and von Seelen, Audio-and Video-Based Biometric Person Authentication.First Int'l Conference, 1997, pp. 439-448.

* cited by examiner

IN-VEHICLE AUDIO BROWSER SYSTEM HAVING A COMMON USABILITY MODEL

TECHNICAL FIELD

This invention relates to an audio browser for vehicles and, more particularly, to the application of a common usability model to multiple modes of operation of the vehicle car stereo.

BACKGROUND OF THE INVENTION

Many car stereo systems (including vehicle computer systems and vehicle entertainment systems) include multiple bands, such as AM, FM1, FM2, and CD. The selected band represents the operating state of the car stereo (e.g., receiving AM stations, receiving FM stations, or playing an audio CD). After selecting a particular band, the user selects a preset button to select between radio stations (or CD in a CD Changer) or a tuning buttons (seek and/or scan) to tune a particular radio station (or select a particular CD track).

Certain vehicle computer systems provide the opportunity to add new features and functions to existing car stereo systems. For example, a vehicle computer system may provide navigational functions in addition to conventional car stereo functions.

As more functions are added to car stereos (or other vehicle computer systems), it may be necessary to add additional buttons to the car stereo to support the new functions. It is important to minimize the number of changes to the current car stereo model to allow the user the easiest adoption path for the new functionality and minimize the negative effects of putting more secondary activities into the car environment. The primary task of a driver of a vehicle is the driving of the vehicle, not manipulating the car stereo controls. Adding a significant number of new buttons to support the new car stereo functions may distract the driver from the primary task of driving the vehicle. Therefore it is important to provide a usability model that is familiar to the user of the car stereo to minimize distractions while driving the vehicle.

SUMMARY OF THE INVENTION

The systems and methods described herein provide a common usability model for multiple modes of operation of a car stereo system. The basis of the invention is the extension of the current car stereo into a more flexible "audio browsing" model. The common usability model extends the typical car stereo usability model with new functionality while maintaining the typical car stereo functions that have been learned by many vehicle users. By maintaining typical car stereo functions, users can more easily interact with a more intelligent device because they already know how to perform, for example, the radio and CD player functions. The addition of a small number of buttons to implement new car stereo functionality minimizes the differences between the new audio browser and conventional car stereos to the user of the new audio browser.

According to one aspect of the invention, an audio browser includes a first set of buttons that select a preset item. A second button selects between a set of primary audio control bands and a set of conditional audio control bands. A third button selects a band from the set of bands selected by the second button.

Another embodiment of the invention includes a fourth button that activates a function that varies based on the selected band.

BRIEF DESCRIPTION OF THE DRAWINGS

The same reference numerals are used throughout the drawings to reference like components and features.

DETAILED DESCRIPTION

Figure 1:
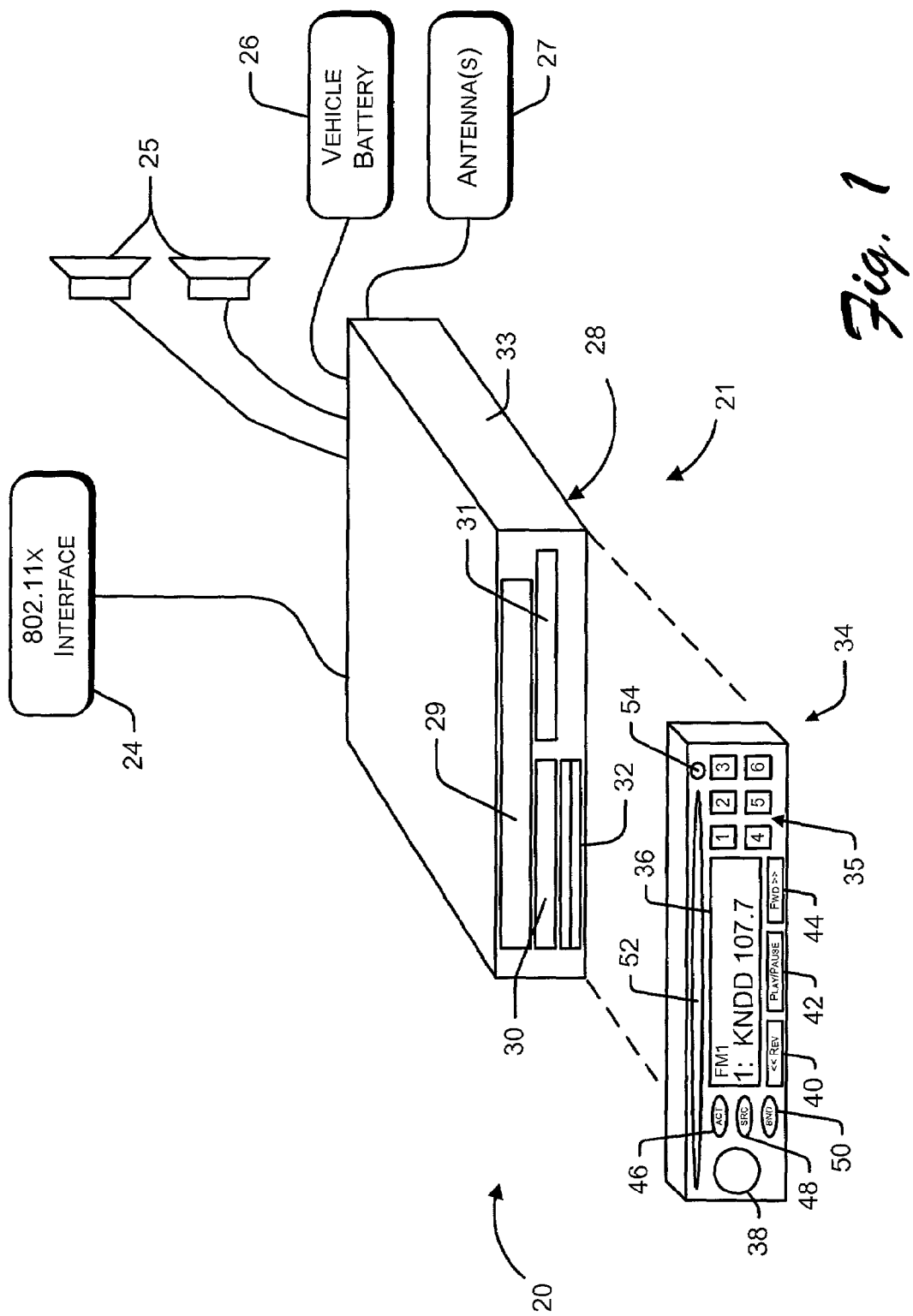
FIG. 1 is a diagrammatic illustration of an in-vehicle audio browser.

FIG. 1 shows an example implementation of an in-vehicle audio browser 20. The audio browser 20 has a centralized computer 21 coupled to various peripheral devices, including speakers 25, vehicle battery 26, and antenna(s) 27. The computer 21 is assembled in a housing 28 that is sized to be mounted in a vehicle dashboard, similar to a conventional car stereo. Preferably, the housing 28 has a form factor of a single DIN (Deutsche Industry Normen). But, it possibly could be housed in a 2 DIN unit or other special form factor for an OEM. The methods and systems described herein may be applied to any type of vehicle computer system, vehicle entertainment system, or vehicle stereo system. In a particular embodiment, the in-vehicle audio browser is a car stereo system.

The computer 21 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be dedicated to specially designed embedded systems. The open hardware architecture is preferably running a multitasking operating system. One preferred operating system is a Windows® brand operating system sold by Microsoft Corporation, such as "Windows Xp™", "Windows NT®", "Windows CE™", or other derivative versions of Windows®. A multitasking operating system allows simultaneous execution of multiple applications.

The computer 21 includes at least one storage media which permits the vehicle user to store and transfer data (i.e. audio content) and possible new programs. One aspect of the invention is the ability to introduce new audio content into the in-vehicle environment. The purpose of the storage media component is to allow for the transportation of audio content in a format that can be played back and navigated by the audio browser. The storage media must either be removable or have some other mechanism (such as wireless access) for update. In the illustrated implementation, the computer 21 has a CD ROM (or DVD-ROM) drive 29 which reads application-related CDs, as well as musical, video, game, or other types of entertainment CDs. In this manner, the CD ROM drive 29 performs a dual role of storage drive and entertainment player. A CD can then be used to transport the audio content to the audio browser. Also, a hard disk drive (not shown in FIG. 1) is included on the computer module which can be used for storing both application programs and user data. In combination with an optional 802.11x interface 24 the hard disk drive can have audio content wirelessly transported to the audio browser. 802.11x represents a family of IEEE standards for wireless networks used for the wireless communication of data between various devices. Alternatively, other wireless communication standards may be used to communicate data between the audio browser 20 and another computing device, such as a personal computer providing data to and from the audio browser.

The computer 21 has an optional smart card reader 31, and dual PCMCIA card sockets 32 which accept PCMCIA card types II and III or CF cards. Hereinafter, the acronym "PC-Card" will be used in place of the acronym "PCMCIA." The smart card and/or any bulk storage PC-Card (memory or hard drive) can also be used to transport audio content to the audio browser.

The storage drives are mounted in a stationary base unit 33 of housing 28. The base unit 33 is constructed and sized to be fixedly mounted in the dashboard. The housing 28 also has a faceplate 34 which is pivotally mounted to the front of the base unit 33. The faceplate can be rotated to permit easy and convenient access to the storage drives. It is possible to build an audio browser without a pivoting faceplate, but there still has to be a way to access to the removable storage media. This could be done by having a CF card reader mounted vertically on the faceplate, or having only 802.11x access to an internal hard drive.

Faceplate 34 functions as an operator interface, having a keypad 35 and a display 36. The faceplate is mountable for viewing by a vehicle operator. The display 36 is preferably a backlit LCD panel having a rectangular array of pixels that are individually selectable for illumination or display. However, it is also possible to have only a set of alpha-numeric (text) enunciator for the display. An enunciator based display will have to have a defined set of areas to display band, preset, and song information. An exemplary set of areas are: 3 characters band area, 1 character preset number area, 10 character preset title area, and 15 character song information area.

The LCD panel is preferably a medium-resolution, bit-mapped display system having at least 10,000 pixels. In the described implementation, the array of pixels has a size of at least 256×64 pixels, which is quite limited in comparison to most desktop displays. The operating system of computer 21 interacts with faceplate keypad 35 and faceplate display 36 as peripheral devices when the faceplate 34 is attached to the housing 28. The operating system will allow for and abstract display models for both the enunciator based display type and bitmap based display. The keypad 35 includes multiple number keys, labeled "1" through "6".

The faceplate 34 has a "Rev" button 40 that represents a reverse (or rewind) function, a "Play/Pause" button 42 that toggles operation between play and pause functions, and a "Fwd" button 44 that represent a forward (or advance) function. The faceplate 34 also has a volume control input 38, an "ACT" button 46 that represents an "action" function, a "SRC" button 48 that represents a "source" function, and a "BND" button 50 that represents a "band" function. The operation of the action, source, and band functions are discussed in greater detail below.

A CD slot 52 allows a CD, such as a music CD, to be inserted into the CD ROM drive 29. Alternatively, a CD may be inserted into CD ROM drive 29 by pivoting or otherwise moving faceplate 34 such that the CD ROM drive is accessible by the user. A power button 54 toggles power to the vehicle computer system 20.

In general, the audio browser 20 is used to integrate new audio content and sources onto one user model and one open platform hardware and software architecture. The basic mode of operation is the playback of audio content that has arrived at the audio browser via the required removable media. This audio content has been collected and organized on some remote device (such as a personal computer) and delivered to the audio browser for playback. The audio content will include configuration information to instruct the audio browser as to which audio content is associated with which band/preset content and if there are special instructions needed for the behavior of the other buttons on the faceplate.

The configuration file is represented in an XML manifest. The manifest contains exemplary information about the behavior and type for each band/preset.

Here is an example of the XML:

```
<?xml version="1.0" encodinq="utf-8"?>
<Manifest Version="0.5" ID="2452346234"
Name="MikkyA_Stuff">
    <Bands CurrentBand="FM">
        <Band ID="FM" Title="FM" Type="radio" CurrentPreset="1">
            <Preset ID="88.5" Title="KPLU 88.5" Setting="1" Freq="FM:88.5"/>
            <Preset ID="96.5" Title="KPNT 96.5" Setting="2" Freq="FM:96.5"/>
        </Band>
        <Band ID="WM1" Title="WM1" Type="playlist" CurrentPreset="2">
            <Preset ID="NPR-ME" Title="Morning Edition" Setting="1" Src="Band0\Preset0\Preset0.ASX" CurrentIndex="" CurrentTime=""/>
            <Preset ID="Market" Title="Market Place" Setting="3" Src="Band0\Preset2\Preset2.ASX" CurrentIndex="" CurrentTime=""/>
            <Preset ID="CBC-W@6" Title="CBC" Setting="4" Src="Band0\Preset3\Preset3.ASX" CurrentIndex="" CurrentTime=""/>
        </Band>
        <Band ID="WRK" Title="WRK" Type="playlist">
            <Preset ID="OutlookToday" Title="OutlookToday" Setting="1" Src="OutlookToday\OutlookToday.asx" CurrentIndex="" CurrentTime=""/>
        </Band>
        <Band ID="PT" Title="Phone Tasks" Type="phonetask">
            <Preset ID="Phone Mail" Title="Phone Mail" Setting="1" Src="Phone\PhoneMail\PhoneMail.asx" CurrentIndex="" CurrentTime=""/>
            <Preset ID="Home Tasks" Title="Home Tasks" Setting="2" Src="Phone\PhoneTaskshome\PhoneTaskshome.asx" CurrentIndex="" CurrentTime=""/>
            <Preset ID="Work Tasks" Title="Work Tasks" Setting="3" Src="Phone\phonetaskswork\phonetaskswork.asx" CurrentIndex="" CurrentTime=""/>
        </Band>
        <Band ID="NT1" Title="Navigation" Type="direction">
            <Preset ID="To Airport" Title="To Airport" Setting="1" Src="nav\toairport\toairport.asx" CurrentIndex="" CurrentTime=""/>
            <Preset ID="To Gas Station" Title="To Gas Station" Setting="2" Src="nav\togasstation\togasstation.asx" CurrentIndex="" CurrentTime=""/>
            <Preset ID="To Museum of Flight" Title="To Museum of Flight" Setting="3" Src="Nav\tomuseumofflight\tomuseumofflight.asx" CurrentIndex="" CurrentTime=""/>
        </Band>
        <Band ID="CL" Title="Contact List" Type="contacts">
            <Preset ID="Home" Title="Home Numbers" Setting="1" Src="Contacts\Home.asx" CurrentIndex="" CurrentTime=""/>
            <Preset ID="Work" Title="Work Numbers"
```

-continued

```
        Setting="2" Src="Contacts\Work.asx" CurrentIndex=""
        CurrentTime=""/>
            </Band>
        </Bands>
    </Manifest>
```

This example manifest is one possible format that can be used to convey the configuration information from a personal computer or service or even between different audio browsers in different vehicles. With the flexibly of XML, this format can easily change to meet the needs for any new bands that are created in the future.

In the embodiment discussed above, the faceplate 34 is pivotally mounted to the base unit 33. In alternate embodiments, faceplate 34 may be detached from the base unit 33. In other embodiments, faceplate 34 is permanently fixed to the base unit 33.

As shown in FIG. 1, many of the buttons on faceplate 34 have been found on car radios for many years. For example, the keypad 35 contains various radio station presets. Additionally, the "Rev", "Play/Pause", and "Fwd" buttons should be familiar to most radio users. However, the "ACT" button has not been included on previous car stereos and provides additional functionality for the new car stereo system shown in FIG. 1.

The BND button (FIG. 1) causes the car stereo to cycle through the various bands supported by the car stereo. In a particular embodiment, the car stereo has the following bands: AM, FM, CD (Audio CD), WM (Windows Media), PT (Phone Tasks), NT (Navigation Tasks), and CL (Contact Lists). The selected band identifies the current function of the car stereo, such as playing the selected FM radio station or providing navigation instructions to a selected destination.

The bands are divided into two different classes: primary audio control and conditional audio control. Primary audio control bands automatically take over the audio output of the audio browser when they are selected. However, conditional audio control bands do not immediately take over the audio output of the audio browser, thereby not interrupting the audio signal listened to by the user. In a particular embodiment, AM, FM, CD, and WM are primary audio control bands. Switching to one of these primary audio control bands causes the car stereo system to switch to the source's current state (e.g., a preset radio station or CD track) and start playing the appropriate audio signal. PT, NT and CL are examples of conditional audio control bands. Switching to one of these conditional bands does not interrupt the current audio signal playing from the last selected primary band. If some action on this conditional band requires an audio output (such as providing audible directions, making a cellular phone call, or providing an audible task), then the primary audio will be paused or muted until the audio output is finished being used by the conditional band. When the conditional band function is finished using the audio output, the audio is returned to the primary band and the audio output is resumed.

In one embodiment, the "SRC" button (FIG. 1) on the faceplate switches between primary and conditional band types and the "BND" button switches between bands within the current type. In another embodiment, the "BND" button switches between all band types.

Figure 2:
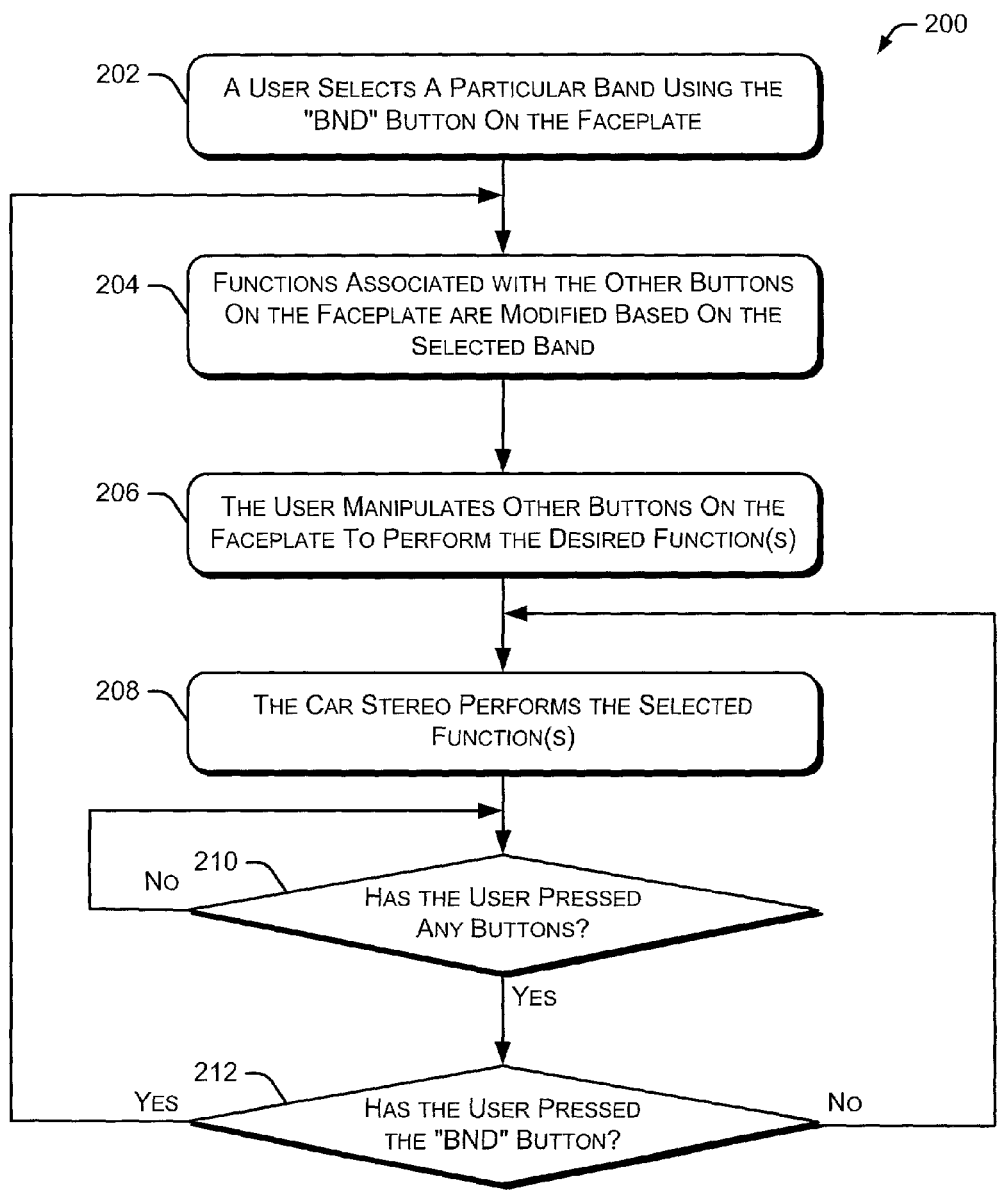
FIG. 2 is a flow diagram illustrating an embodiment of a procedure for handling operation of the "BND" button.

FIG. 2 is a flow diagram illustrating an embodiment of a procedure 200 for handling operation of the "BND" button.

Initially, a user selects a particular band on the car stereo using the BND button on the faceplate (block 202). The functions associated with the other buttons on the faceplate are modified based on the selected band (block 204). The user then manipulates the other buttons on the faceplate to perform the desired function (block 206). The car stereo performs the selected function (block 208). The procedure then determines whether the user has pressed any buttons on the faceplate (block 210). If the user has not pressed any buttons, the operation of the car stereo continues unchanged until one of the buttons is pressed. If the user presses a button, the procedure determines whether the button pressed was the BND button (block 212). If the button was the BND button, then the procedure returns to block 204 to modify the functions associated with the other buttons on the faceplate based on the new band selection. If the button pressed was not the BND button, then the procedure returns to block 208, where the car stereo performs the selected function.

Once a particular band has been selected, the behavior of the other buttons on the faceplate changes to the appropriate behavior for the selected band type. The appropriate behavior of the various buttons for each band type is discussed below.

Figure 3:
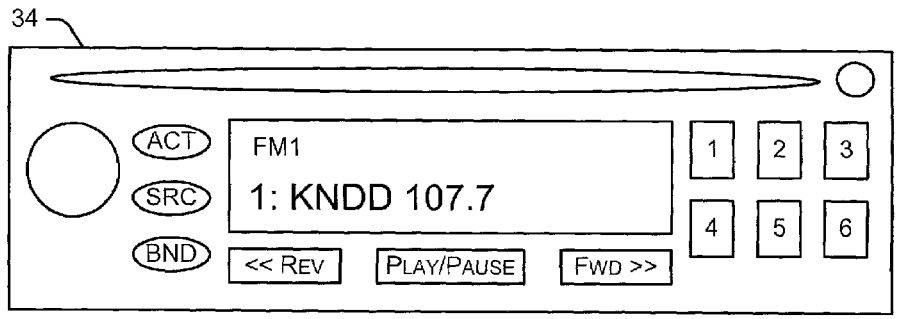
FIGS. 3–8 illustrate a car stereo faceplate in different modes of operation.

FIG. 3 illustrates a car stereo faceplate in the FM1 mode. The faceplate shown in FIG. 3 is substantially the same as faceplate 34 shown in FIG. 1. The faceplate display indicates that the first preset has been selected (indicated by "1:"), which is radio station KNDD having a frequency of 107.7. In the FM1 mode, the buttons on the faceplate perform the following functions:

1–6 Presets: Press: Switches to a preset radio frequency.
  Press & Hold: Sets the preset to the current radio frequency.
Reverse: Press: Scans backwards through the radio frequencies.
  Press & Hold: Scans backward through the cache of the currently playing radio frequency.
Forward: Press: Scans forward through the radio frequencies.
  Press & Hold: If the radio frequency currently playing was paused then it scans forward through the cache of the currently playing radio frequency.
Play/Pause: Press: Pauses or restarts radio broadcast by saving the audio stream to storage.
Action: Press: Saves the current playing song or small historical time segment (the last 5 minutes and the next five minutes).

Similar functions are associated with the buttons in other radio band modes (e.g., FM2, FM3, and AM).

Figure 4:
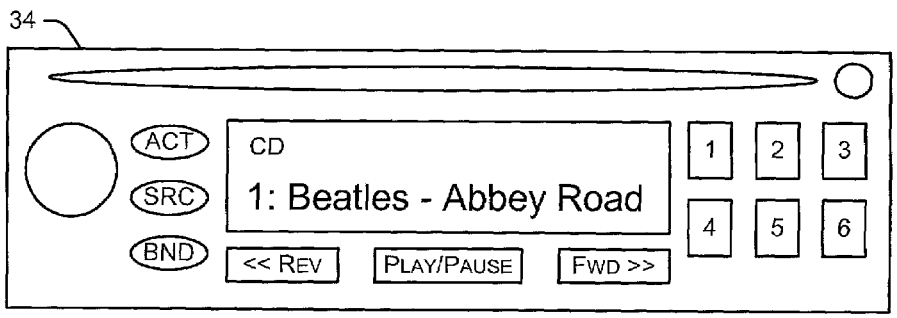

FIG. 4 illustrates a car stereo faceplate in the CD mode. The faceplate display indicates that the first CD in a CD changer has been selected, which is an audio CD containing music from the Beatles' album "Abbey Road". In the CD mode, the buttons on the faceplate perform the following functions:

1–6 Presets: Press: Switches to a CD within a CD changer.
Reverse: Press: Skips to previous track on the current CD.
  Press & Hold: Scans backward within the current track on the current CD.
Forward: Press: Skips to next track on the current CD.
  Press & Hold: Scans forward within the current track on the current CD.
Play/Pause: Press: Pauses or plays the current track on the current CD.

Action: Press: Saves the current playing track to storage and places the song in the next available preset track on a WM band.
  Press & Hold: Save the current playing CD to storage and places the CD in the next available preset on a WM band.

Figure 5:
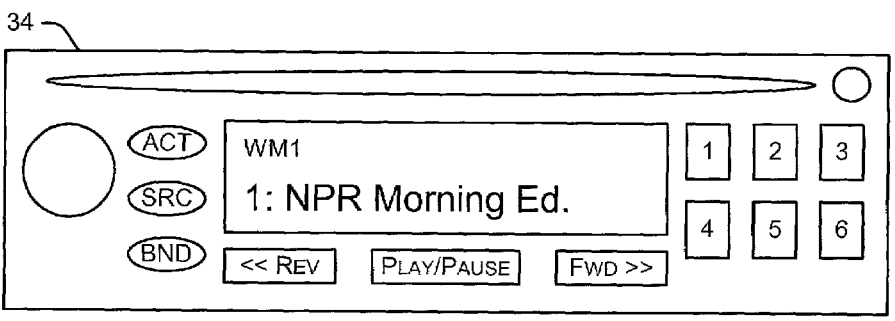

FIG. 5 illustrates a car stereo faceplate in the WM (Windows Media) mode. The WM band presents represent an audio playlist. The WM band may also be referred to as a digital media band. The playlist could represent a saved CD, a random set of 10 songs from a musical collection or songs from a radio collection. The faceplate display indicates that the first playlist has been selected, which is a morning issue of the NPR broadcast. In the WM mode, the buttons on the faceplate perform the following functions:

1–6 Presets: Press: Switches to a preset playlist that has either been saved (from radio or CD) or loaded via (wireless or removable) storage medium.
Reverse: Press: Skips to previous track in the current playlist.
  Press & Hold: Scans backward within the current track in the current playlist.
Forward: Press: Skips to next track in the current playlist.
  Press & Hold: Scans forward within the current track in the current playlist.
Play/Pause: Press: Pauses or plays the current track in the current playlist.
Action: No function for this band.

Figure 6:
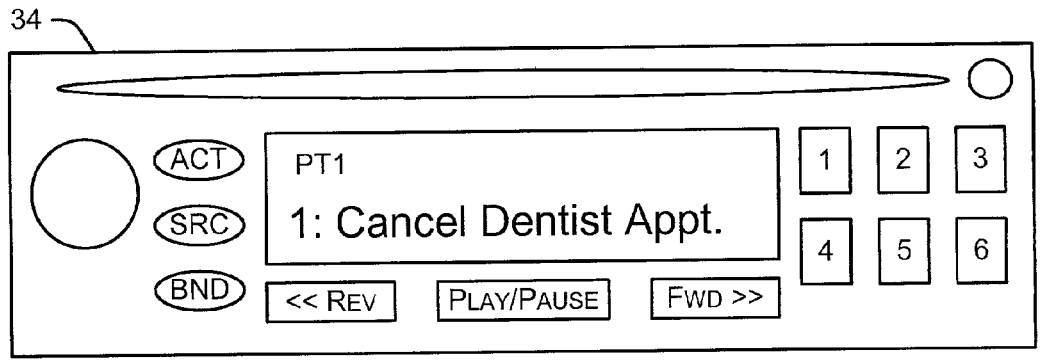

FIG. 6 illustrates a car stereo faceplate in the PT (Phone Task) mode. The faceplate display indicates that the first phone task has been selected, which is a phone task to cancel a dentist appointment. In one embodiment, phone tasks are personal information manager (PIM) tasks that require a phone call to complete the task. Phone tasks contain a simple set of text reminders as to what needs to be done with the task and an associated phone number to call to complete the task. In the PT mode, the buttons on the faceplate perform the following functions:

1–6 Presets: Press: Selects a phone task that has been loaded via (wireless or removable) storage medium. The first line of the text description of the task is placed on the display. The primary audio output is not interrupted.
Reverse: Press: Display is changed to previous line of text description of the current task.
  Press & Hold: Display is changed to the first line of the text description of the current task.
Forward: Press: Display is changed to the next line of the text description of the current task.
  Press & Hold: Display is changed to the last line of the text description of the current task.
Play/Pause: Press: Translates the description of the current task from text to speech. Interrupts the current primary audio output while the translation is playing and resumes once the translation is completed.
Action: Press: Dials the phone number associated with the current task. Interrupts the primary audio output while the call is being made and resumes once it is completed. If a call was in progress, then the phone is hung up.
  Press & Hold: Marks the task as completed.

Figure 7:
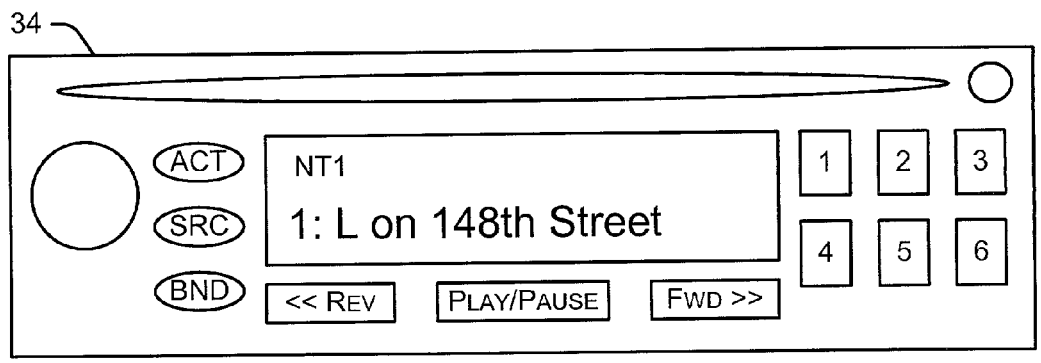

FIG. 7 illustrates a car stereo faceplate in the NT (Navigation Tasks) mode. The faceplate display indicates that the first step in navigating to the desired destination (Turn Left on 148th Street). Navigation tasks is a list of directions that are used to get from one point to another. In the NT mode, the buttons on the faceplate perform the following functions:

1–6 Presets: Press: Selects a navigation task that has been loaded via (wireless or removable) storage medium. The first line of the text direction of the task is placed on the display. The primary audio output is not interrupted.
Reverse: Press: Display is changed to the previous line of the text direction of the current task.
  Press & Hold: Display is changed to the first line of the text direction of the current task.
Forward: Press: Display is changed to the next line of text direction of the current task.
  Press & Hold: Display is changed to the last line of the text direction of the current task.
Play/Pause: Press: Translates the current line of the text direction of the current task from text to speech. Interrupts the current primary audio output while the translation is playing and resumes once the translation is complete.
Action: No function for this band.

Figure 8:
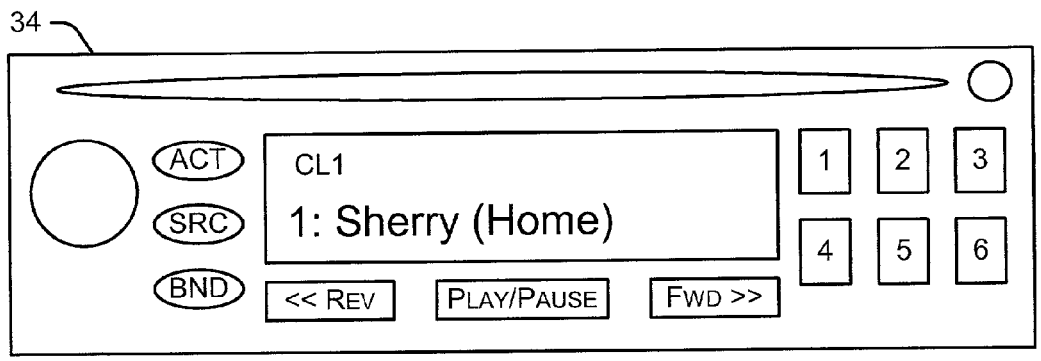

FIG. 8 illustrates a car stereo faceplate in the CL (Contact List) mode. The faceplate display indicates that the first preset (1) in has been selected (Sherry's home phone number). In the CL mode, the buttons on the faceplate perform the following functions:

1–6 Presets: Press: Selects a preset contact from the list. The name and phone number of the contact is placed on the display. The primary audio output is not interrupted.
  Press & Hold: Saves the current contact to the current preset.
Reverse: Press: Skips to the previous contact in the entire contact list.
  Press & Hold: Skips backwards 10 contacts.
Forward: Press: Skips to the next contact in the entire contact list.
  Press & Hold: Skips forwards 10 contacts.
Play/Pause: Press: Translates the contact name from text to speech. Interrupts the current primary audio output while the translation is playing and resumes when the translation is completed.
Action: Press: Dials the currently selected phone number. Interrupts the current primary audio output while the call is being made and resumes once it is completed. If a call was in process then the phone is hung up.

The various bands and functions discussed above are provided by way of example. A particular car stereo system may offer any number of different bands and functions, including bands and functions not discussed herein.

A particular audio browser includes a memory capable of storing an operating system and one or more application programs that execute on one or more microprocessors. The microprocessor(s) are programmed by means of instructions stored at different times in various computer-readable storage media of the device. This storage media may include, for example, smart cards, a disk drive, or other volatile or non-volatile storage mechanism. Application programs are typically installed or loaded into the secondary memory of a computer. At execution, the application programs are loaded at least partially into the computer's primary electronic memory. The invention described herein includes these and other various types of computer-readable storage media when such media contain instructions or programs for implementing the steps and features described herein in conjunction with a microprocessor or other data processor. The invention also includes the computer and other devices themselves when programmed according to the methods and techniques described herein.

Although the invention has been described in language specific to structural features and/or methodological steps, it is to be understood that the invention is defined in the appended claims is not necessarily limited to the specific features or steps described. Rather, the specific features and steps are disclosed as preferred forms of implementing the claimed invention.

The invention claimed is:

1. An in-vehicle audio browser comprising:
   a first set of buttons configured to select a preset item;
   a second button configured to select between a first list of items and a second list of items associated with the audio browser, wherein the first list comprises a first plurality of bands including primary audio control bands and the second list comprises a second plurality of bands including conditional audio control bands;
   a third button configured to cycle through and select a desired band from the list of items selected by the second button;
   a fourth button configured to activate a function that varies depending on a selected band; and
   a fifth set of buttons including at least one button configured to move through elements within the selected band.

2. An in-vehicle audio browser as recited in claim 1, wherein the first plurality of bands includes at least one of a radio band, and a CD player band.

3. An in-vehicle audio browser as recited in claim 1, wherein the second plurality of bands includes at least one of:
   a digital media band;
   a navigation band;
   a contact list band; and
   a telephone task band.

4. An in-vehicle audio browser as recited in claim 1, further comprising a display configured to identify the selected band.

5. An in-vehicle audio browser as recited in claim 1, wherein the primary audio control bands affect audio output when selected.

6. An in-vehicle audio browser as recited in claim 1, wherein the fourth button is configured to save currently playing audio output.

7. An in-vehicle audio browser as recited in claim 1, wherein the fourth button is configured to dial a phone number associated with a current task.

8. An in-vehicle audio browser as recited in claim 1, wherein the conditional audio control bands do not affect audio output unless a function requiring audio output is activated with the fourth button.

9. An in-vehicle audio browser as recited in claim 1, wherein the audio browser stores various information, and wherein the stored information is synchronized with an external computing device.

10. An in-vehicle audio browser as recited in claim 1, wherein the at least one button of the fifth set of buttons is configured to move though elements within the selected band when pressed, and to perform an alternate function when pressed and held.

11. An in-vehicle audio browser as recited in claim 10, wherein the alternate function comprises scanning through a cache of a selected element.

12. An in-vehicle audio browser comprising:
    a first button configured to select between a set of primary audio control bands and a set of conditional audio control bands;
    a second button configured to select a band from the set of bands selected by the first button; and
    a third button configured to scan through elements within the band selected by the second button.

13. An in-vehicle audio browser as recited in claim 12, wherein the primary audio control bands affect audio output when selected.

14. An in-vehicle audio browser as recited in claim 12, wherein the conditional audio control bands do not affect audio output unless some action on the band requires audio output.

15. An in-vehicle audio browser as recited in claim 12, further comprising a fourth button configured to activate a function that varies based on the band.

16. An in-vehicle audio browser as recited in claim 15, wherein the fourth button is configured to activate a secondary function that varies based on the selected band when the fourth button is pressed and held.

17. An in-vehicle audio browser as recited in claim 12, wherein the third button is further comprised to perform an alternate function when pressed and held, the alternate function being dependant on the band selected by the second button.

18. A user interface for an in-vehicle audio browser, the user interface comprising:
    a source button to select between a set of primary audio control bands and a set of conditional audio control bands;
    a band button to select a desired band from a selected set of audio control bands; and
    at least one scan button to scan though elements within the desired band.

19. A user interface as recited in claim 18, wherein the primary audio control bands affect audio output when selected.

20. A user interface as recited in claim 18, wherein the conditional audio control bands do not affect audio output unless some action of the band requires an audio output.

21. A user interface as recited in claim 18, wherein the primary audio control bands include at least one of a radio band and a CD player band.

22. A user interface as recited in claim 18, wherein the conditional audio control bands include at least one of a navigation band and a contact list band.

23. A user interface as recited in claim 18, wherein the at least one scan button is configured to scan through elements within a band selected using the band button when the at least one scan button is pressed, and further wherein the at least one scan button is configured to perform an alternate function depending on the band selected using the band button when the at least one scan button is pressed and held.

24. One or more computer-readable media having stored thereon a computer program that, when executed by one or more processors, causes the one or more processors to:
    display a currently selected car radio band, wherein a car radio supports a primary audio control band class and a conditional audio control band class;
    change a currently selected band class in response to activation of a first car radio button;
    move through a list of items associated with the currently selected band class in response to activation of a second car radio button; and
    move through elements in an item in response to activation of a third car radio button.

25. One or more computer-readable media as recited in claim 24, wherein the one or more processors further select a particular element in the item using a set of preset buttons.

26. One or more computer-readable media as recited in claim 24, wherein the primary audio control band class includes at least one of an AM radio band, an FM radio band, and a CD player band.

27. One or more computer-readable media as recited in claim 24, wherein the conditional audio control band class includes at least one of a navigation band and a contact list band.

28. One or more computer-readable media as recited in claim 24, wherein the one or more processors further save currently playing audio content in response to activation of an ACT button on the car radio.

29. One or more computer-readable media as recited in claim 24, wherein the one or more processors further dial a phone number currently displayed on the car radio in response to activation of an ACT buff on the car radio.

30. One or more computer-readable media as recited in claim 29, wherein the one or more processors further marks a task as completed in response to the ACT button on the car radio being activated and held.

31. One or more computer-readable media as recited in claim 24, wherein the one or more processors further perform an alternate function when the third car radio button is activated and held.

32. One or more computer-readable media as recited in claim 31, wherein the alternate function includes scanning through a current track.

* * * * *